(12) United States Patent
Ishii et al.

(10) Patent No.: US 7,403,580 B2
(45) Date of Patent: Jul. 22, 2008

(54) SOFTWARE DEFINED RADIO SYSTEM

(75) Inventors: Hirotake Ishii, Hachioji (JP);
Katsuhiko Tsunehara, Hachioji (JP);
Takashi Yano, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 634 days.

(21) Appl. No.: 11/025,944

(22) Filed: Jan. 3, 2005

(65) Prior Publication Data
US 2006/0045212 A1 Mar. 2, 2006

(30) Foreign Application Priority Data
Aug. 24, 2004 (JP) ............................... 2004-243090

(51) Int. Cl.
*H03D 1/00* (2006.01)
(52) U.S. Cl. .................. 375/340; 375/350; 375/355
(58) Field of Classification Search .................. 375/350, 375/340, 355; 370/466–469
See application file for complete search history.

(56) References Cited

U.S. PATENT DOCUMENTS 6,496,546 B1 * 12/2002 Allpress et al. ............. 375/316
7,203,488 B2 * 4/2007 Luneau ..................... 455/422.1

FOREIGN PATENT DOCUMENTS

| JP | 5-300017 | 4/1992 |
| JP | 2003-198257 | 12/2001 |

OTHER PUBLICATIONS

Kohno et al., "Current Status and the Future of Software Radio", pp. 1112-1119.
Kohno et al., "Current Status and the Future of Software Radio", Transactions of the Institute of Electronics, Information and Communication Engineers, B vol. J84-B No. 7, Jul. 2001, pp. 1112-1119, Total of 30 pages in English translation.

* cited by examiner

*Primary Examiner*—David C. Payne
*Assistant Examiner*—Rahel Guarino
(74) *Attorney, Agent, or Firm*—Reed Smith LLP; Stanley P. Fisher, Esq.; Juan Carlos A. Marquez, Esq.

(57) ABSTRACT

The invention provides a technique that saves rate conversion accompanying complicated calculations and shares an analog filter for anti-aliasing in a sampling device. The sampling device employs an anti-alias filter having a fixed cutoff frequency, an A/D converter and a D/A converter each having a clock signal input, which are capable of varying a sampling frequency, and a PLL circuit capable of varying the frequency of a clock signal; and it sets the sampling frequency not lower than an integral multiple of a signal bandwidth and double the cutoff frequency for sampling.

21 Claims, 8 Drawing Sheets

| STANDARD (PROTOCOL) | REF | VCODIV | REFDIV | CLK1(fs) |
|---|---|---|---|---|
| A | 8MHz | 252 | 25 | 80.64MHz |
| B | 8MHz | 275 | 25 | 88MHz |
| C | 8MHz | 256 | 25 | 81.92MHz |
| D | 8MHz | 250 | 25 | 80MHz |

| ADDRESS | VALUE |
|---|---|
| 000 | VCODIV_A |
| 001 | VCODIV_B |
| 002 | VCODIV_C |
| 003 | VCODIV_D |
| 004 | REFDIV_A |
| 005 | REFDIV_B |
| 006 | REFDIV_C |
| 007 | REFDIV_D |
| 008 | TAP_A[O] |

| | |
|---|---|
| 017 | TAP_A[F] |
| 018 | TAP_B[O] |

| | |
|---|---|
| 027 | TAP_B[F] |
| 028 | TAP_C[O] |

| | |
|---|---|
| 037 | TAP_C[F] |
| 038 | TAP_D[O] |

| | |
|---|---|
| 047 | TAP_D[F] |
| 048 | m_A |
| 049 | m_B |
| 04A | m_C |
| 04B | m_D |

SOFTWARE DEFINED RADIO SYSTEM

CLAIM OF PRIORITY

The present application claims priority from Japanese application JP 2004-243090 filed on Aug. 24, 2004, the content of which is hereby incorporated by reference into this application.

FIELD OF THE INVENTION

The present invention relates to a software defined radio system that transmits/receives signals of plural and different communication protocols, which is suitable in use especially for a case that the plural communication protocols have different signal bandwidth.

BACKGROUND OF THE INVENTION

Many radio systems have been made with different communication protocols. In such circumstances, there is a radio system that varies the system function by varying the software program and reconfiguring the hardware to implement the radio system function with plural systems on the common platform, which is generally called the software defined radio system. Many efforts toward the software defined radio system have been introduced with various treatises and so forth. As an example, the collective treatise B, Vol. J84-B, No. 7, pp 1112-1119 (2001/7) from the Japanese Electronic Information Communications Association describes the status quo and future of the software defined radio system.

In view of the flexibility produced by varying the software program and reconfiguring the hardware, it is preferred to make up the software defined radio system so as to perform main processing with software, while reducing as many analog circuits as possible and using digital circuits or processors. However, the operation speed of digital circuits, the throughput of processors, and the conversion speed of AD converters and DA converters have their limits. And there are problems in the price and the power consumption. Therefore, it is not realistic to implement all the functions of the software defined radio system with the software processing using digital circuits and processors.

Accordingly, the allocation of analog circuits and digital circuits becomes extremely important in the software defined radio system. It is very important to allocate the sampling unit that administers the conversion of analog signals and digital signals to which part of the radio system. That is, to perform the sampling in the RF band (radio frequency band), or to perform it in the IF band (intermediate frequency band), or to perform it in the base band (BB) will give great differences in the circuit scale of analog circuits, the circuit scale of digital circuits, the sampling frequency, and the sampling accuracy and so forth. Here, the sampling unit represents an AD (Analog to Digital) converter that converts an analog signal into a digital signal, a DA (Digital to Analog) converter that converts a digital signal into an analog signal, and a part made up with an anti-aliasing filter which becomes necessary with the above converters.

In the case of performing the sampling in the RF band, the radio system is made up with full digital circuits, becomes easy to reconfigure the hardware, and becomes a realistic software defined radio system that can easily conform it to any communication protocols of the radio system. However, the sampling frequency becomes some ten GHz in this case, and the AD converter and DA converter having such a high frequency are not realistic in the price and power consumption. Not only for the sampling frequency, has it required about 20 bits as the quantization bit number.

In the case of performing the sampling in the IF band, the sampling frequency can be reduced to a lower frequency in comparison to the sampling in the RF band. However, in view of the price and power consumption, it is not yet realistic in the radio system such as a mobile phone and a wireless LAN available to general users. The high-speed data communication as seen in the wireless LAN and the like is expected widespread in the future. However, since the high-speed data communication requires a wide base band, it is impossible to lower the IF band.

Assuming the sampling in the RF band or the IF band, there is another method of taking on the undersampling that performs the sampling with a sampling frequency not higher than the Nyquist sampling frequency. In this case, the input band width of the AD converter and the frequency accuracy of the sampling are required in the same level as the sampling in the RF band and the IF band. The sampling in the base band is regarded as a general makeup, and many software defined radio systems called the multimode wireless device take on this configuration.

The software defined radio system is required to transmit/receive the signals having different bandwidth for different protocols. In the sampling in the base band, there appears a necessity of sampling with multiple different sampling frequencies. In that case, the cutoff frequencies of the anti-aliasing filters have to be varied in correspondence with the multiple different sampling frequencies.

The JPA No. 300017/1993 describes a traditional method of varying the sampling frequency and the bandwidth of the anti-aliasing filter, in correspondence with the frequencies of the analog input signals. And the JPA No. 198257/2003 describes a traditional method of fixing the sampling frequencies and the cutoff frequencies of the anti-aliasing filters, and performing the rate conversion to the data sampled by the fixed sampling frequencies by means of the digital signal processing.

SUMMERY OF THE INVENTION

In the case of varying the cutoff frequency of the anti-aliasing filter to correspond with the signal bandwidths of the respective communication protocols, the analog filter that can vary the cutoff frequency becomes necessary. There is the analog filter that can vary the cutoff frequency, called the switched capacitor filter, which requires a clock signal having the speed equivalent to about 100 times of the cutoff frequency. And the filter using a superconducting material can vary the cutoff frequency, but it requires a cooling device, which is not suitable for a small wireless device. It is also conceivable to prepare plural filters and select one, which leads to increasing the number of components and the size of the substrate and increasing the cost.

In view of the rate conversion with various forms by the digital signal processing, the rate conversion needs immense digital signal processing, which leads to increasing the circuit scale or the operating capability of the processor. As a method of decreasing the circuit scale or the operating capability of the processor, it is conceivable to use an approximate value of the sampling frequency or simplified rate conversion accompanied with jitters. However, these methods involve quality deterioration of the signal. It is the problem to be solved by the present invention not to use the rate conversion with complicated arithmetic operations and to share the analog filter for anti-aliasing in the sampling device.

The present invention includes an anti-aliasing filter having a cutoff frequency fc that is fixed or common to respective communication protocols, an AD converter and a DA converter each having a clock signal input that can vary a sampling frequency, and a PLL circuit that can vary the frequency of the clock signal, performs the sampling by setting the sampling frequency not lower than the integral multiple of the signal bandwidth and double the cutoff frequency, and makes it possible to communicate the signals of the communication protocols having plural and different bandwidths in multiple modes.

The present invention exhibits an effect of reducing the number of components and lowering the cost, because the anti-aliasing filter with a fixed cutoff frequency, the DA converter, and the AD converter can be used commonly while communicating the signals of the plural communication protocols having different bandwidths in multiple modes. And if the sampling frequencies are set almost equally, the bandwidths of respective components in the RF unit 30 can be made common, which leads to facilitating the RF circuit design, reducing the number of components, and lowering the cost.

DETAILED DESCRIPTION OF THE PREFERRED EMBODIMENTS

The preferred embodiments relating to the present invention will be described with reference to the accompanying drawings.

Figure 1:
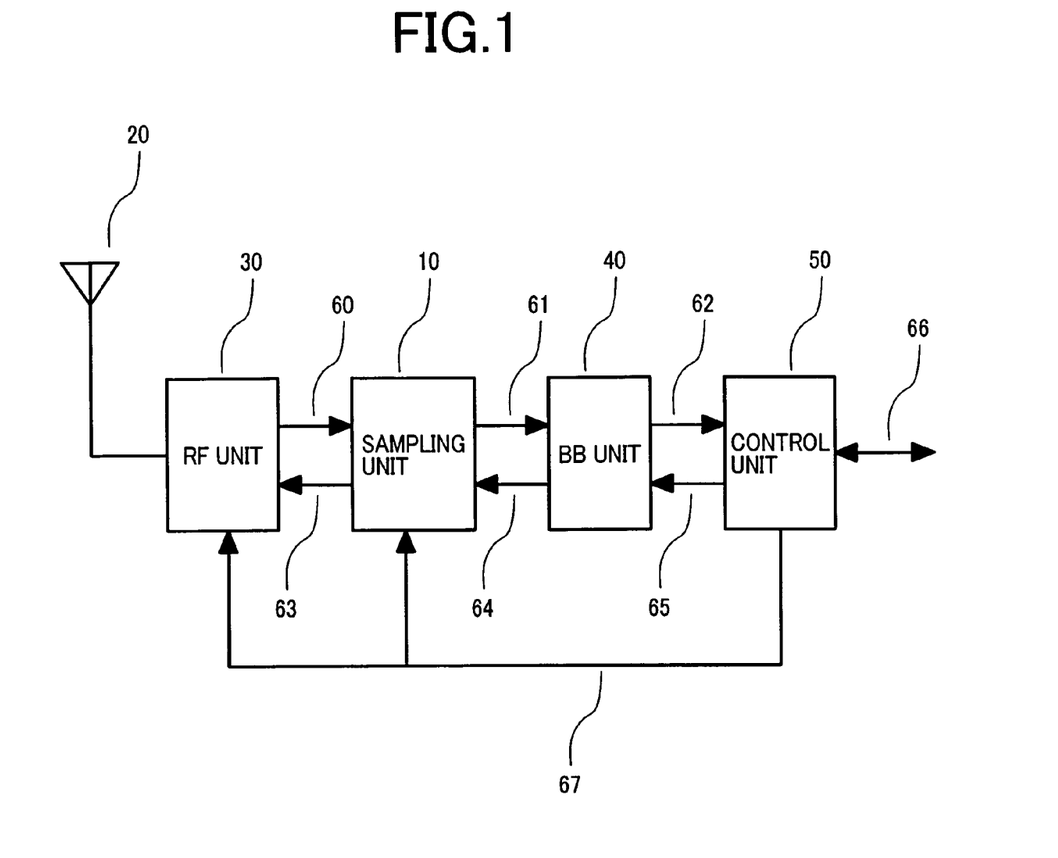
FIG. 1 is a block diagram of a software defined radio system relating to the present invention.

FIG. 1 illustrates a block diagram of the software defined radio system that adopts a sampling device relating to the invention. The example here is the software defined radio system capable of the multimode communications having the sampling in the base band assumed. The software defined radio system includes a sampling unit 10, an antenna 20, an RF unit 30, a BB unit 40, and a control unit 50.

A received signal by the antenna 20, conforming to a specific communication protocol, is inputted to the RF unit 30. The RF unit 30 includes a duplexer, an LNA (Low Noise Amplifier), a band pass filter, a mixer, an IQ demodulator, a HPA (High Power Amplifier), and an AGC (Auto Gain Control) and so forth. The received signal by the antenna 20 is subjected to the following processing by the RF unit 30: TX/RX separation, bandwidth restriction, low-noise amplification, frequency down-conversion, gain adjustment, IQ orthogonal demodulation, which is turned into a base band analog reception signal 60.

The base band analog reception signal 60 outputted from the RF unit 30 is inputted to the sampling unit 10. The base band analog reception signal 60 inputted to the sampling unit 10 experiences the bandwidth restriction using an anti-aliasing filter for preventing aliasing produced by sampling extra spectra. The anti-aliasing filter includes an analog filter having the Bessel or Butterworth characteristic.

The base band analog reception signal 60 experiencing the bandwidth restriction by the anti-aliasing filter is inputted to an AD converter. The base band analog reception signal 60 is subjected to the sampling and quantization by the AD converter, which is turned into a base band digital reception signal 61. The base band digital reception signal 61 outputted from the sampling unit 10 is inputted to the BB unit 40.

The base band digital reception signal 61 inputted to the BB unit 40 is subjected to the base band signal processing such as demodulation, despread, and error correction and so forth, which is turned into a reception data 62. The reception data 62 outputted from the BB unit 40 is inputted to the control unit 50.

The reception data 62 inputted to the control unit 50 is subjected to the protocol control to be an information data 66, which is sent to the host layer. The host layer corresponds to the application layer in the case of a terminal, or the network layer in the case of a base station.

On the other hand, the information data 66 sent from the host layer is inputted to the control unit 50. The information data 66 inputted to the control unit 50 has the preamble necessary for synchronization and so forth added, which becomes transmission data 65 with a frame composed according to a specific format. The transmission data 65 outputted from the control unit 50 is inputted to the BB unit 40.

The transmission data 65 inputted to the BB unit 40 is subjected to the base band signal processing such as error correction, modulation, and spread and so forth, which is turned into a base band digital transmission signal 64. The base band digital transmission signal 64 outputted from the BB unit 40 is inputted to the sampling unit 10.

The base band digital transmission signal 64 inputted to the sampling unit 10 is inputted to the DA converter, and is subjected to the digital/analog conversion. A digital/analog converted base band analog transmission signal is subjected to the bandwidth restriction using the anti-aliasing filter for preventing extra spectrum emission. The anti-aliasing filter includes an analog filter having the Bessel or Butterworth characteristic. The digital/analog converted base band analog transmission signal is subjected to the bandwidth restriction by the anti-aliasing filter, which becomes a base band analog transmission signal 63.

The base band analog transmission signal 63 outputted from the sampling unit 10 is inputted to the RF unit 30. The base band analog transmission signal 63 inputted to the RF unit 30 is subjected to the processing such as IQ orthogonal modulation, frequency up-conversion, bandwidth restriction, and power amplification and so forth, which is transmitted from the antenna 20. The parameters that the sampling unit 10 needs are to be designated by the control signal 67 from the control unit 50.

Figure 2:
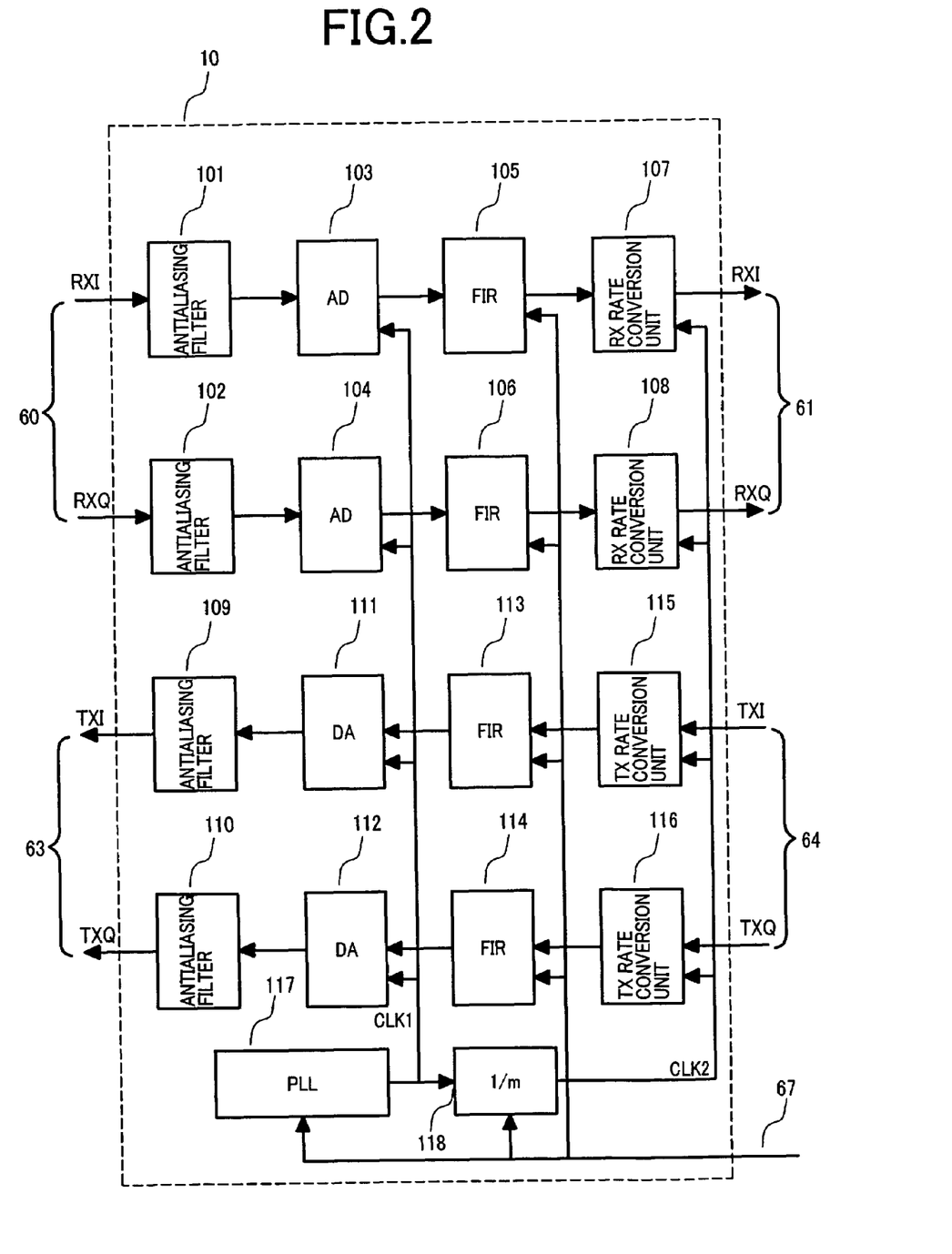
FIG. 2 is a block diagram of a sampling unit 10 relating to the present invention.

Next, the sampling unit 10 will be described in detail, which is a feature of this invention. FIG. 2 illustrates a construction of the sampling unit 10 being the feature of this invention. The sampling unit 10 includes anti-aliasing filters 101, 102, 109, and 110, AD converters 103 and 104, DA converters 111 and 112, FIR (Finite Impulse Response) filters 105, 106, 113, and 114, RX rate conversion units 107 and 108, TX rate conversion units 115 and 116, a PLL 117, and a frequency divider 118. The anti-aliasing filter is an analog filter that eliminates the signals unnecessary for the sampling in order to prevent the aliasing noises by the sampling. The DA converter performs a function to convert a digital signal into an analog signal. The AD converter performs a function to convert an analog signal into a digital signal. The FIR filter is a digital filter that eliminates the noises outside a desired signal bandwidth. The RX rate conversion unit performs a function to decimate (thin out) the reception data and lower the rate. The TX rate conversion unit performs a function to insert zero into the transmission data and raise the rate. The frequency divider performs a function to lower the clock frequency by dividing the clock signal frequency at a constant cycle.

The base band analog reception signal 60 outputted from the RF unit 30 is inputted to the sampling unit 10. The base band analog reception signal 60 inputted to the sampling unit 10 is split into an RXI signal and RXQ signal, which are inputted to the anti-aliasing filters 101 and 102, respectively. Here, the anti-aliasing filters 101 and 102, AD converters 103 and 104, FIR filters 105 and 106, rate conversion units 107 and 108 each have the same constructions, and the RXI signal and RXQ signal receive the same processing from these units.

The cutoff frequencies of the anti-alias filters 101 and 102 will be determined as follows. Now, it is assumed that there are four types of communication protocols in which the software defined radio system is capable of the multimode communication, and they are respectively named as communication protocols A, B, C, and D. Thereat, the software defined radio system is presumed which can perform communications while switching the four types of communication protocols appropriately.

And it is assumed that the symbol rate (chip rate in the case of the CDMA communication system) fba in the communication protocol A is 3.84 Mbps, the symbol rate fbb in the communication protocol B is 11 Mbps, the symbol rate fbc in the communication protocol C is 16.384 Mbps, the symbol rate fbd in the communication protocol D is 20 Mbps. Here, the signal bandwidth of each communication system is half the symbol rate.

The sampling method is classified into the Nyquist sampling, over-sampling, and under-sampling, in terms of the relation between the sampling frequency and the signal frequency bandwidth. The Nyquist sampling is the sampling method that performs the sampling with the frequency of double the maximum frequency in the desired signal (this is called the Nyquist frequency). That is, the Nyquist frequency is the lowest frequency with which the desired signal can be restored. In this case, the anti-alias filter requires an analog filter having the characteristic that sharply falls at half the Nyquist frequency. The over-sampling is the sampling method that performs the sampling with the frequency exceeding the Nyquist frequency. In this case, the anti-aliasing filter needs an analog filter having the characteristic that gently falls in comparison with the Nyquist sampling.

The under-sampling is the sampling method that performs the sampling with the frequency lower than the Nyquist frequency. This sampling method performs the frequency conversion and the sampling simultaneously by utilizing the fact that the input signal is returned. In this case, the anti-alias filter needs a band pass filter in the RF band. It also requires an AD converter having a wide input bandwidth and a high-precision clock generator as well. The conventional sampling devices generally use the over-sampling that does not need the anti-alias filter having a sharp falling characteristic. Many of them perform the over-sampling with the sampling frequency of nearly four times the Nyquist frequency.

In the case of performing the over-sampling with the frequency of four times the Nyquist frequency, the sampling frequency in the communication protocol A (for example, W-CDMA system) is four times 3.84 Mbps, 15.36 MHz; the sampling frequency in the communication protocol B (for example, wireless LAN IEEE802.11b) is four times 11 Mbps, 44 MHz; the sampling frequency in the communication protocol C (for example, CDM satellite sound broadcast) is four times 16.384 Mbps, 65.536 MHz; and the sampling frequency in the communication protocol D (for example, wireless LAN IEEE802.11a) is four times 20 Mbps, 80 MHz.

Figure 3:
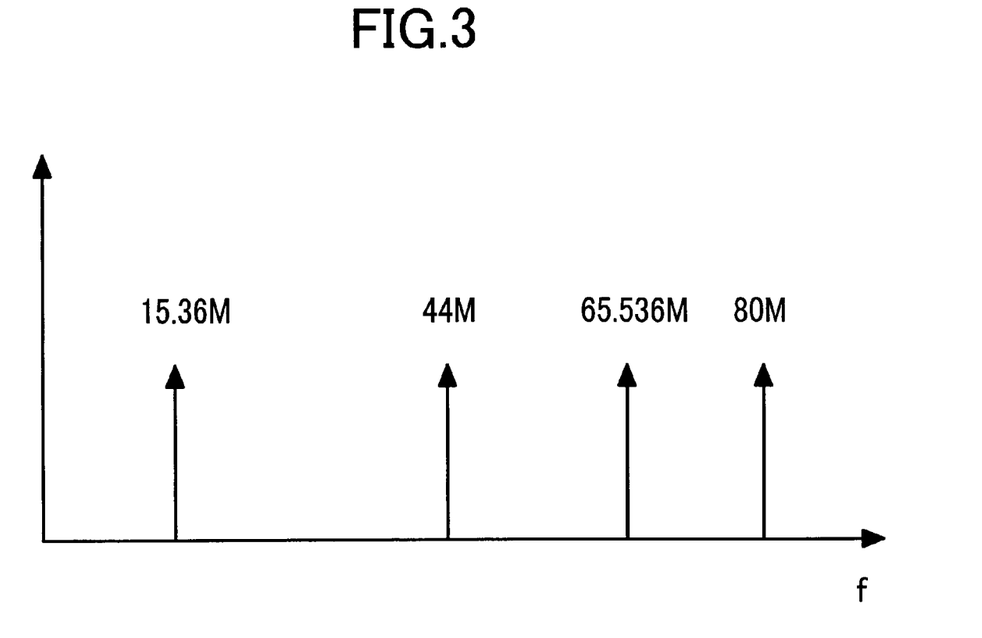
FIG. 3 is a chart illustrating the state of the conventional sampling frequencies.

FIG. 3 illustrates the state of the sampling frequencies of the respective communication protocols. For transmitting and receiving the protocols conforming to all these communication protocols with one radio system, the radio system according to the conventional technique requires preparing the generators that generate the sampling frequencies for these protocols and the anti-aliasing filters corresponding to these sampling frequencies.

Figure 4:
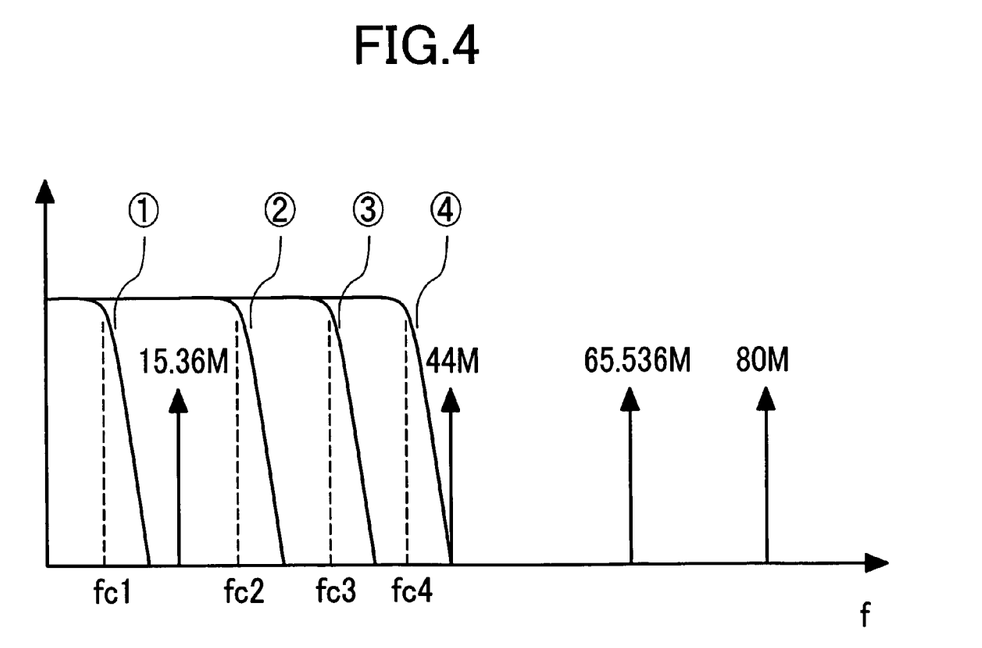
FIG. 4 is a characteristic chart of the conventional anti-aliasing filters.

FIG. 4 illustrates the relation between the sampling frequencies and the anti-aliasing filters. The horizontal axis represents the frequency and the vertical axis represents the amplitude in the drawing. The cutoff frequency of the anti-aliasing filter must be not lower than the maximum frequency of the desired signal, and must be not higher than half the sampling frequency. The anti-aliasing filter corresponding to the sampling frequency 3.84 MHz in the communication protocol A needs a filter (1) having the falling characteristic at the cutoff frequency fc1; the anti-aliasing filter corresponding to the sampling frequency 15.36 MHz in the communication protocol B needs a filter (2) having the falling characteristic at the cutoff frequency fc2; the anti-aliasing filter corresponding to the sampling frequency 40 MHz in the communication protocol C needs a filter (3) having the falling characteristic at the cutoff frequency fc3; and the anti-aliasing filter corresponding to the sampling frequency 44 MHz in the communication protocol D needs a filter (4) having the falling characteristic at the cutoff frequency fc4.

Therefore, in order to make all the four types of communication protocols possible of communications in the multimode, the radio system needed to mount four types of analog filters having these characteristics (1) through (4) and make them selective, or to mount a filter that can vary the cutoff frequency. In the case of mounting four, the consequence leads to increasing the number of components and increasing the cost. In this embodiment, the sampling frequency and the cutoff frequency of the anti-aliasing filter will be set as follows.

It is assumed that the sampling frequency in the communication protocol A is fsa, the sampling frequency in the communication protocol B is fsb, the sampling frequency in the communication protocol C is fsc, and the sampling frequency in the communication protocol D is fsd. Among the four types of communication protocols, the sampling frequency that can be the highest sampling frequency is assumed as fsd in view of the symbol rate in the communication protocol and the number of over-sampling in the performance. In the case of setting the sampling frequency in the communication protocol D four-fold to the symbol rate fbd, the following formula is given.

[Formula 1]

$$fsd = fbd \times 4 \qquad \text{formula 1}$$

Next, the sampling frequencies of the communication protocols A, B, and C are set as follows.

[Formula 2]

$$fsa = fba \times ma \qquad \text{formula 2}$$

[Formula 3]

$$fsb = fbb \times mb \qquad \text{formula 3}$$

[Formula 4]

$$fsc = fbc \times mc \qquad \text{formula 4}$$

[Formula 5]

$$fsa \geq fsd \qquad \text{formula 5}$$

[Formula 6]

$$fsb \geq fsd \qquad \text{formula 6}$$

[Formula 7]

$$fsc \geq fsd \qquad \text{formula 7}$$

And, fsa is set to satisfy the formula 5, fsb is set to satisfy the formula 6, and fsc is set to satisfy the formula 7. Here, ma, mb, and mc are the integral numbers. The formula (5), formula (6), and formula (7) are the necessary condition, and the following conditions should preferably be added in order to prevent excessive increase of the power consumption of the circuits and excessive loading to the circuits.

[Formula 8]

The minimum ma to satisfy $fsa \geq fsd$  formula 8

[Formula 9]

The minimum mb to satisfy $fsb \geq fsd$  formula 9

[Formula 10]

The minimum mc to satisfy $fsc \geq fsd$  formula 10

On the other hand, the cutoff frequencies of the anti-aliasing filters are set as follows. Assuming that the base band signal bandwidth in the communication protocol A is fma (about 1.92 MHz), the base band signal bandwidth in the communication protocol B is fmb (about 5.5 MHz), the base band signal bandwidth in the communication protocol C is fmc (about 8.192 MHz), and the base band signal bandwidth in the communication protocol D is fmd (about 10 MHz), the cutoff frequency fc of the anti-aliasing filter is set as follows.

[Formula 11]

$$\text{MAX}(fma, fmb, fmc, fmd) \leq fc \leq \text{MIN}(fsa, fsb, fsc, fsd)/2 \qquad \text{formula 11}$$

The cutoff frequency fc of the anti-aliasing filter is set equal to or higher than the widest frequency bandwidth of the base band signal bandwidth fma, fmb, fmc, and fmd, and equal to or lower than half the lowest frequency of the sampling frequencies fsa, fsb, fsc, and fsd. When the above feature of this invention is applied to the communication protocols A, B, C, and D, the respective sampling frequencies can be set as follows.

[Formula 12]

$$fsa = 3.84 \text{ MHz} \times ma = 3.84 \text{ MHz} \times 21 = 80.64 \text{ MHz} \qquad \text{formula 12}$$

[Formula 13]

$$fsb = 11 \text{ MHz} \times mb = 11 \text{ MHz} \times 11 = 88 \text{ MHz} \qquad \text{formula 13}$$

[Formula 14]

$$fsc = 16.384 \text{ MHz} \times mc = 16.384 \text{ MHz} \times 5 = 81.92 \text{ MHz} \qquad \text{formula 14}$$

[Formula 15]

$$fsd = 20 \text{ MHz} \times 4 = 80 \text{ MHz} \qquad \text{formula 15}$$

Figure 5:
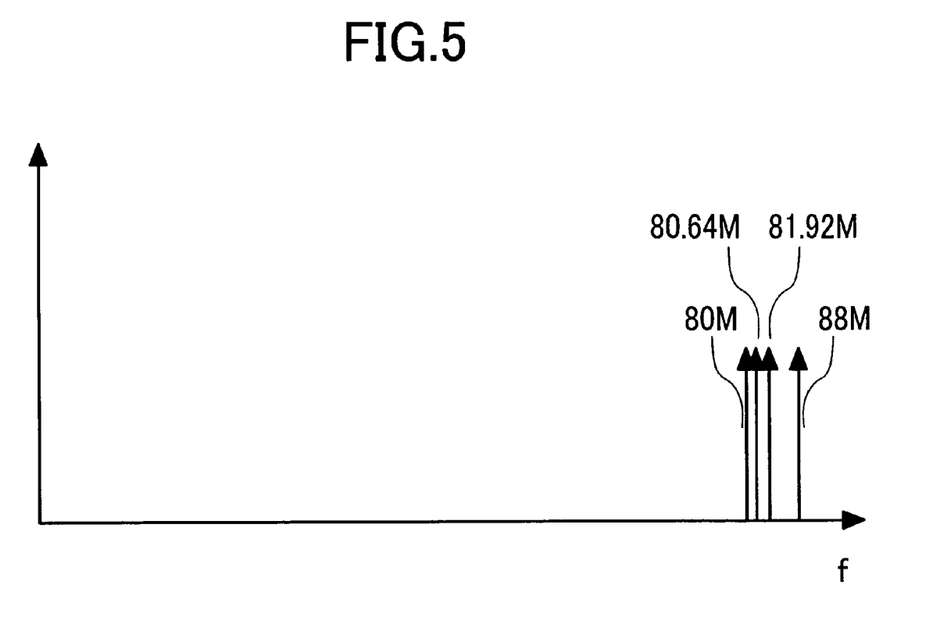
FIG. 5 is a chart illustrating the state of the sampling frequencies relating to the present invention.

FIG. 5 illustrates the state of the sampling frequencies in this embodiment. And the cutoff frequency fc5 of the anti-aliasing filter is given as follows.

[Formula 16]

$$10 \text{ MHz}(=fmd) \leq fc5 \leq 40 \text{ MHz}(=fsd/2) \qquad \text{formula 16}$$

When the cutoff frequency fc of the anti-aliasing filter is approximated to the left-hand side, namely, the widest frequency bandwidth of the base band signal bandwidth fma, fmb, fmc, and fmd, the anti-alias filter only needs an analog filter having a gently falling characteristic of a lower order, which is a merit, but there is a demerit that the base band signal bandwidth cannot be made wide. On the other hand, when the cutoff frequency fc of the anti-aliasing filter is approximated to the right-hand side, namely, half the lowest frequency of the sampling frequencies fsa, fsb, fsc, and fsd, the base band signal bandwidth can be made wide, which is a merit, but there is a demerit that the anti-alias filter needs an analog filter having a sharply falling characteristic of a higher order.

Figure 6:
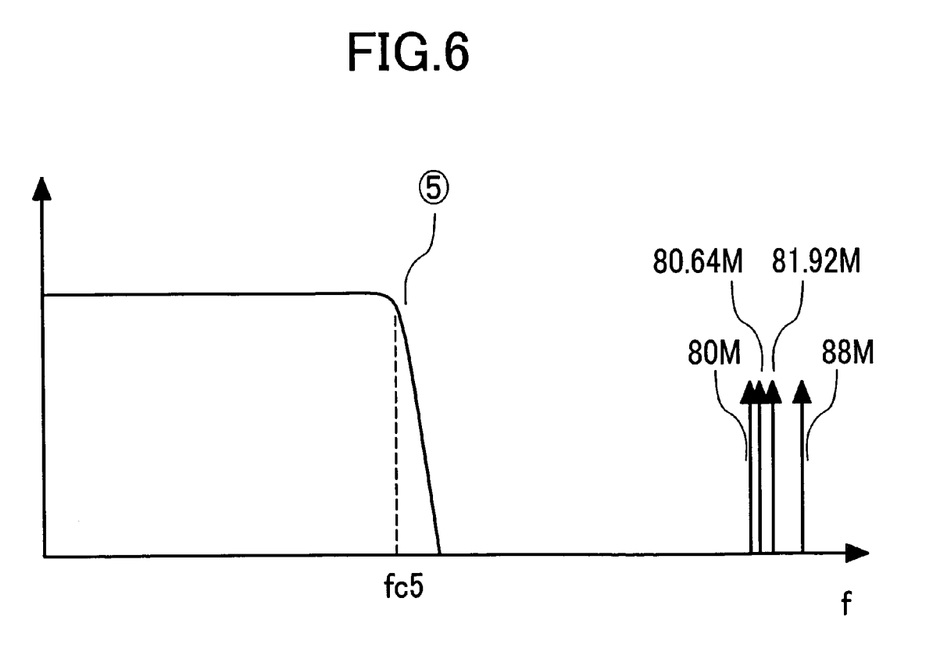
FIG. 6 is a characteristic chart of the anti-aliasing filters relating to the present invention.

FIG. 6 illustrates an example of the anti-alias filter. The anti-alias filter has the cutoff frequency fc5 as shown by the curve (5) in the drawing, which can commonly be used by the communication protocols. This will solve the problem that needs to mount four types of filters having different falling characteristics and make them selective, or to mount a filter that can vary the cutoff frequency.

Next, the method of generating the clock signals for the sampling frequencies fsa, fsb, fsc, and fsd in the respective communication protocols will be described. The sampling frequencies fsa, fsb, fsc, and fsd are generated with the PLL (Phase-Locked Loop) circuit.

Figure 7:
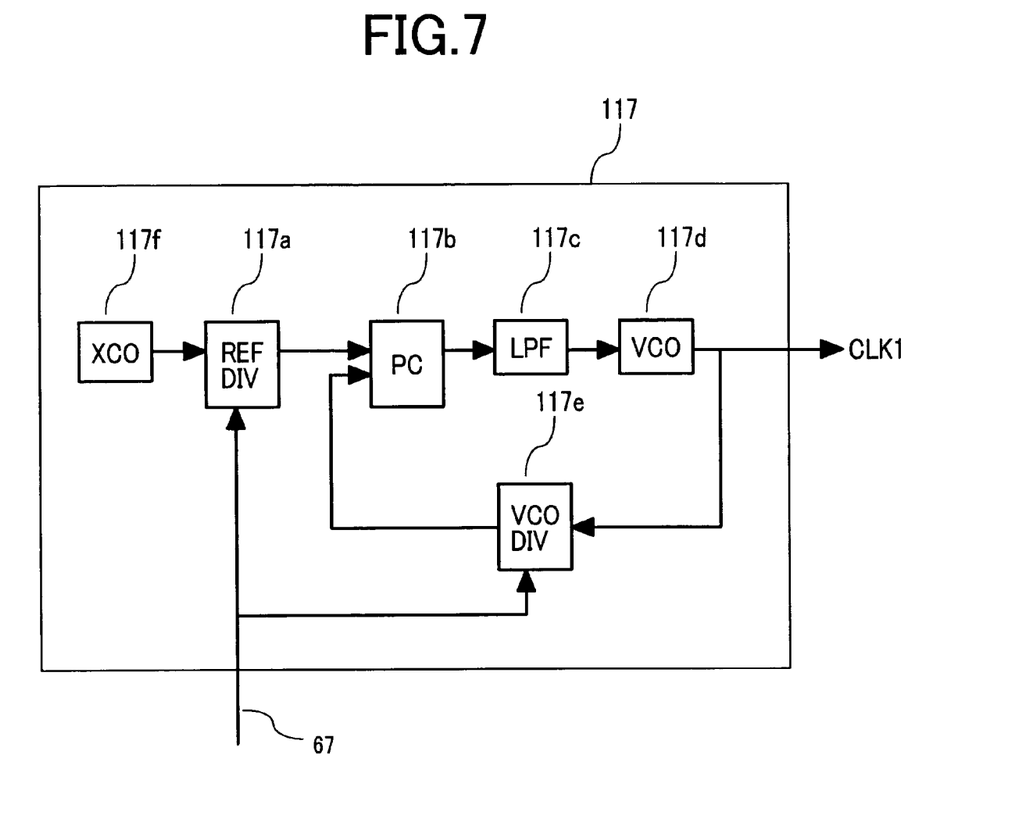
FIG. 7 is a block diagram of a PLL circuit 117 relating to the present invention.

FIG. 7 illustrates a block diagram of a PLL circuit 117. The PLL circuit 117 performs a function to generate various types of clock signals that are suitable for the respective communication protocols and necessary for the sampling unit 10. The PLL circuit 117 includes a reference frequency divider (frequency dividing rate is REFDIV) 117a, a phase comparator (PC) 117b, a low pass filter (LPF) 117c, a voltage controlled oscillator (VCO) 117d, a VCO frequency divider (frequency dividing rate is VCODIV) 117e, and a crystal oscillator (XCO) 117f.

The reference clock outputted from the crystal oscillator 117f is inputted to the reference frequency divider 117a, where the frequency is divided with a predetermined frequency dividing rate. The output signal from the reference frequency divider 117a is inputted to the phase comparator 117b, which performs the phase comparison between the output signal from the VCO frequency divider 117e and the output signal from the reference frequency divider 117a. The signal outputted from the phase comparator 117b is inputted to the LPF 117c, where the high frequency signal components are removed by a predetermined transfer characteristic, which becomes a voltage control signal to the VCO 117d.

The voltage control signal outputted from the LPF 117c is inputted to the VCO 117d, which generates a signal frequency corresponding to the voltage control signal to output as the sampling clock. Here, the frequency dividing rate (REFDIV) of the reference frequency divider 117a and the frequency dividing rate (VCODIV) of the VCO frequency divider 117e are notified to the respective units by the control signal 67 transmitted from the control unit 50.

Figure 8:
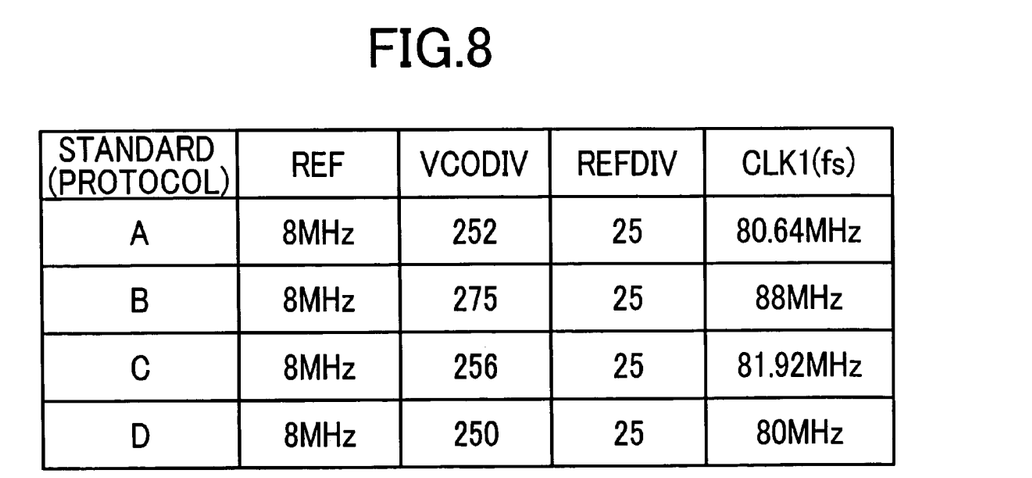
FIG. 8 illustrates an example of the constants of the PLL circuit 117 relating to the present invention.

FIG. 8 illustrates an example of generating the clock signals corresponding to the sampling frequencies fsa, fsb, fsc, and fsd in the respective communication protocols, in the case of setting the oscillating frequency of the crystal oscillator 117f to 8 MHz. Now, fixing the oscillating frequency REF of the crystal oscillator 117f at 8 MHz and varying the frequency dividing rate REFDIV of the reference frequency divider 117a and the frequency dividing rate VCODIV of the VCO frequency divider 117e will make the frequency of CLK1 outputted from the PLL circuit variable. The following formula (17) gives the frequency fs of CLK1.

[Formula 17]

$$fs = (VCODIV/REFDIV) \times REF \qquad \text{formula 17}$$

Thus, the PLL is able to generate any frequencies given by the above rational formula. However, it is preferable to set the sampling clock frequencies, in consideration for the restriction on the frequency variable range of the VCO, the restrictions on the frequency dividing rates of the reference frequency divider and the VCO frequency divider, and the restrictions given by the formulas (8), (9), and (10) due to the frequency accuracy of the crystal oscillator and so forth.

Here, the frequency variable range of the VCO should be regarded as ±5% from the center frequency in view of the price of the components and the frequency stability. As seen from FIG. 8, the clock frequencies fall within ±4 MHz from 84 MHz as the center frequency, namely, within the range of ±5%.

Returning to FIG. 2, the outputs from the AD converters 103 and 104, which are over-sampled by the sampling frequency determined in correspondence with the anti-alias filters having the above characteristics and the communication protocols, are inputted to the FIR filters 105 and 106, respectively. The digital filters with the FIR filter configuration perform the bandwidth restrictions using the base band signal bandwidths fma, fmb, fmc, and fmd in the communication protocols as the cutoff frequencies to the over-sampled base band digital reception signals inputted to the FIR filters 105 and 106. And the digital filters can take on the roll-off characteristics as needed. Further, the FIR filters 105 and 106 have the function that can switch the above into the tap coefficients having the falling characteristics corresponding to the signal bandwidths in the respective communication protocols, by the control signal 67 from the control unit 50.

The outputs from the FIR filters 105 and 106 are inputted to the RX rate conversion units 107 and 108, respectively. The RX rate conversion units perform the rate conversion to the over-sampled base band digital reception signals to attain the number of over-sampling that the base band signal processor 40 needs. In general, the base band signal processor that performs detection, despread, and demodulation is regarded to need the number of over-sampling of about one-fold to four-fold symbol rate.

Figure 9:
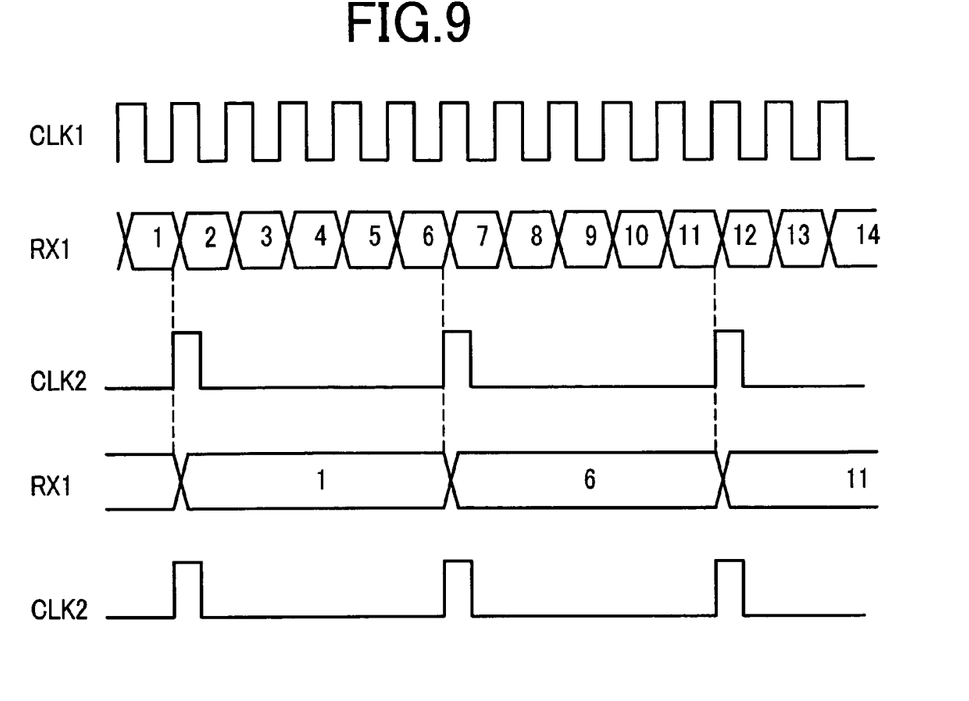
FIG. 9 illustrates an example of a timing chart in RX rate conversion units 107, 108.

FIG. 9 illustrates an example of the communication protocol C, in which the RX rate conversion units 107 and 108 perform the rate conversion from five-fold over-sampling into one-fold over-sampling. This is the example using the communication protocol C. The signal in the communication protocol C has experienced five-fold over-sampling in the AD converter (formula 14). When the BB unit 40 needs the signal of the symbol rate, the RX rate conversion unit needs to decimate the over-sampled data into ⅕.

Figure 10:
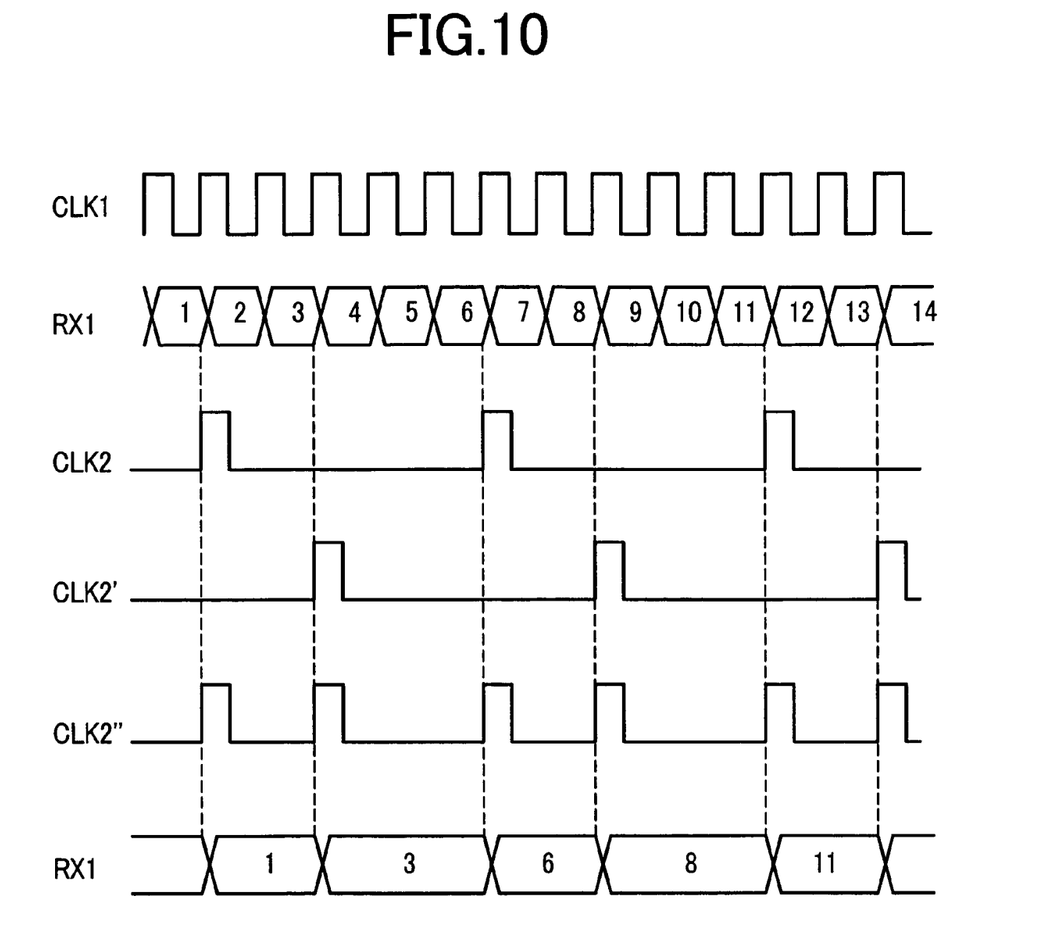
FIG. 10 illustrates an example of a timing chart in the RX rate conversion units 107, 108.

The sampling clock inputted to the rate conversion units 107 and 108 is five-fold over-sampled by CLK1, and a consequent data sequence is RX1. And the 1/m frequency divider 118 divides CLK1 into 1/m, and a consequent clock signal is CLK2. Here, m is equal to 5 (mb). In performing the rate conversion from five-fold over-sampling to one-fold over-sampling, latching the five-fold over-sampled data sequence RX1 by CLK2 will attain a data sequence RX2 of one-fold over-sampling. As found from FIG. 9, the rate conversion is made by decimating the data of RX1 at equal intervals. In such rate conversion that does not apparently have equal intervals as the rate conversion from five-fold over-sampling to two-fold over-sampling, the method as shown in FIG. 10 is available.

The frequency of the clock signal CLK1 is divided into ⅕ by the 1/m frequency divider 118, and a consequent clock signal is CLK2. The clock signal CLK2 is phase-shifted into a delayed clock signal CLK2'. The logical sum of CLK2 and CLK2' is CLK2". Latching the data sequence RX1 by CLK2" will attain the data sequence RX2 (1, 3, 6, . . . ) in which the data (2, 4, 5, . . . ) are decimated from the data sequence RX1 (1, 2, 3, 4, 5, 6, . . . ).

The above method makes the rate conversion by the rate of ⅖ possible. However, in order to utilize the feature of this invention to the maximum, it is recommendable to lower the number of over-sampling of the RX rate conversion units 107 and 108 to one-fold, namely, the symbol rate.

As to latching the data at which phase in performing the rate conversion, it is recommendable to sequentially vary the phase and detect the optimum timing for CLK2, while monitoring the detection result by the base band signal processor 40, or the correlative value by the despread in the case of the spread spectrum communication system, or the frame error rate (or packet error rate) and bit error rate detected in the control unit 50.

And, it is still more recommendable to control the control voltage to VCO and find out the optimum frequency and phase for CLK1, while monitoring the detection result by the base band signal processor 40, or the correlative value by the despread in the case of the spread spectrum communication system, or the frame error rate (or packet error rate) and bit error rate detected in the control unit 50 in the same manner as detecting the optimum phase for CLK2 by replacing XCO117f with the voltage controlled oscillator VCO in the PLL circuit 117.

The base band digital reception signal 61 rate-converted in the rate conversion units 107 and 108 is inputted to the BB unit 40, and is subjected to the base band signal processing such as detection, despread, and error correction. Here, the processing order of the signals RXI and RXQ in the FIR filters 105 and 106 and the rate conversion units 107 and 108 may be replaced. The circuit construction in FIG. 2 emphasizes the falling characteristic of the FIR filter, but to perform the rate conversion after the AD conversion and input the signal to the FIR filter after lowering the rate will lead to lowering the power consumption in the FIR filter.

Next, the base band digital transmission signal 64 outputted from the BB unit 40 is inputted to the sampling unit 10. The base band digital transmission signal 64 inputted to the sampling unit 10 is split into a TXI signal and a TXQ signal, which are inputted to the TX rate conversion units 115 and 116, respectively. Here, the TX rate conversion units 115 and 116, FIR filters 113 and 114, DA converters 111 and 112, and anti-aliasing filters 109 and 110 each have the same constructions, and the TXI signal and TXQ signal receive the same processing from these units.

Figure 11:
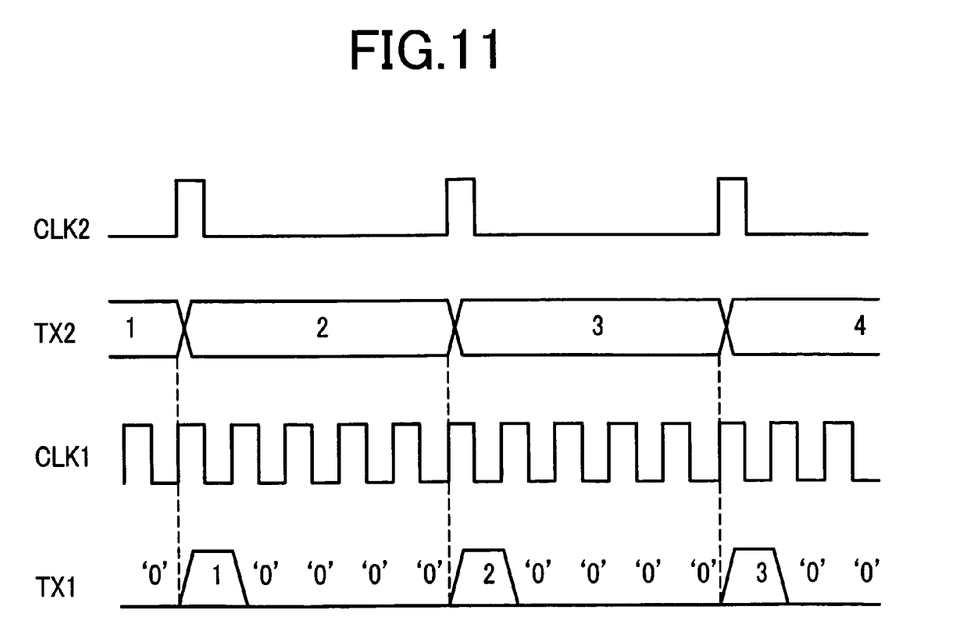
FIG. 11 illustrates an example of a timing chart in TX rate conversion units 115, 116.

The TX rate conversion units 115 and 116 convert the base band digital transmission signal 64 of the symbol rates fba, fbb, fbc and fbd in the respective communication protocols A, B, C, and D, respectively, into the rates given by the formulas (12), (13), (14), and (15) that satisfy the formulas (1) through (7). FIG. 11 illustrates an example of the communication protocol C, in which the TX rate conversion performs the rate conversion from the symbol rate (one-fold over-sampling)

into five-fold over-sampling. Provided that TX2 represents the base band digital transmission signal 64 of the symbol rate inputted to the TX rate conversion units 115 and 116, TX2 is the data sequence of the symbol rate, which is synchronized with CLK2. As seen from FIG. 11, the rate conversion from the symbol rate into five-fold over-sampling is carried out by inserting "0" at the rise timing of CLK1.

The outputs from the rate conversion units 115 and 116 are inputted to the FIR filters 113 and 114. The digital filters with the FIR filter configuration perform the bandwidth restrictions by the cutoff frequencies corresponding to the base band signal bandwidths of fma, fmb, fmc, and fmd in the communication protocols, to the data sequences after the rate conversion inputted to the FIR filters 113 and 114. And the digital filters can take on the roll-off characteristics as needed. Further, the FIR filters 113 and 114 have the function that can switch the above into the tap coefficients having the falling characteristics corresponding to the signal bandwidths in the respective communication protocols, by the control signal 67 from the control unit 50.

The outputs from the FIR filters 113 and 114 are inputted to the DA converters 111 and 112. The DA converters 111 and 112 convert the digital signals with the bandwidth restrictions applied by the FIR filters 113 and 114 using CLK1 into analog signals. The outputs from the DA converters 111 and 112 are inputted to the anti-alias filters 109 and 110, respectively. The anti-alias filters can share the filter having the characteristic as shown by the curve (5) in FIG. 6 with the respective communication protocols.

The outputs TXI and TXQ from the anti-alias filters 109 and 110 are inputted to the RF unit 30 as the base band analog transmission signal 63. Here, the processing order of the signals TXI and TXQ in the rate conversion units 115 and 116 and the FIR filters 113 and 114 may be replaced. The circuit construction in FIG. 2 emphasizes the falling characteristic of the FIR filter, but to input the signal to the FIR filter before the rate conversion will lead to lowering the power consumption in the FIR filter.

Figure 12:
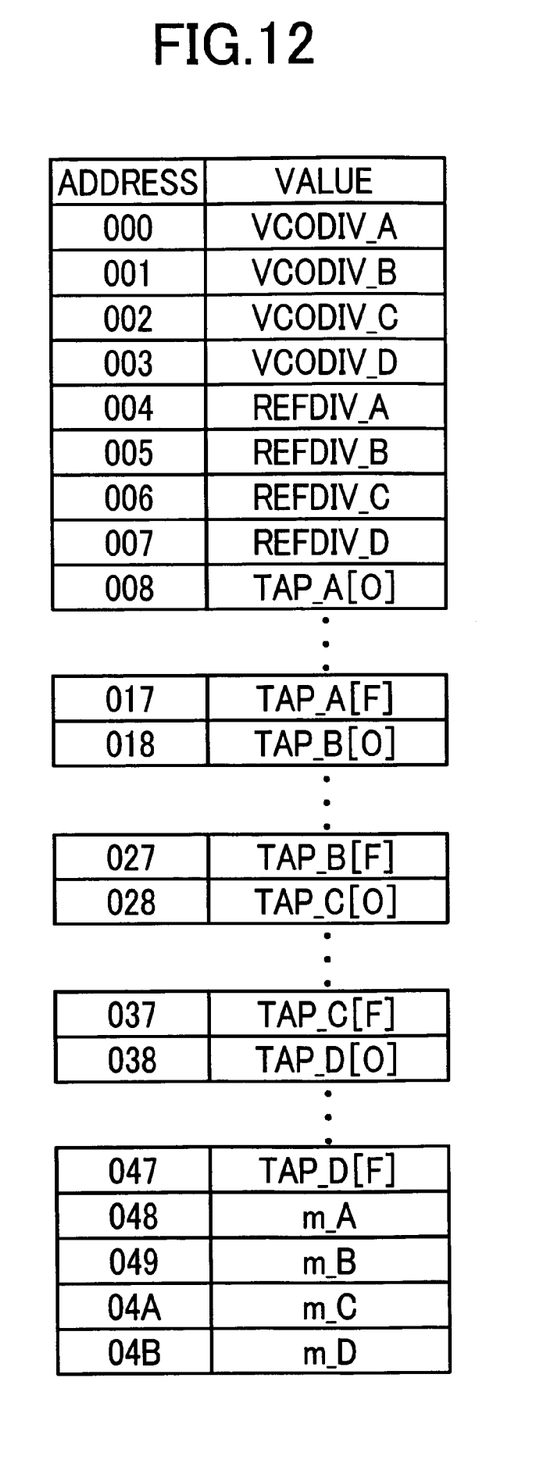
FIG. 12 illustrates an example of parameters stored in a control unit.

Next, the operation of the control unit 50 will be described with reference to FIG. 1 and FIG. 12. In FIG. 1, the control unit 50 notifies the related components of the parameters required for the sampling unit 10 by the control signal 67 to sample the signals with different bandwidths. FIG. 12 illustrates the parameters stored in the control unit 50. As the parameters to be set in the PLL circuit that generates various types of clock signals that the sampling unit 10 needs, the control unit 50 stores the frequency dividing rate VCODIV of the VCO frequency divider used for the communication protocols, the frequency dividing rate REFDIV of the reference frequency divider, the tap coefficients of the FIR filter (16 taps for each communication protocol in FIG. 12), and the m being the decimating rate in the reception rate converter/the interpolating rate in the transmission rate converter by the number of the different communication protocols. The parameters stored in the control unit 50 are notified to the sampling unit 10 when the software defined radio system switches the communication protocol during transmission and reception.

In general, many software defined radio systems search the radio waves of the communication protocols possible of communications in the area where a user resides, and select a communication protocol in the most excellent wave condition or a communication protocol possible of communications at the lowest cost, thus starting communications. When this invention is applied to this situation, the control unit 50 notifies the sampling unit 10 of the frequency dividing rate VCODIV_A of the VCO frequency divider and the frequency dividing rate REFDIV_A of the reference frequency divider in order to generate the clock signals for the sampling in the communication protocol A. Next, the control unit 50 notifies the tap coefficients TAP_A[0] through TAP_A[F] of the FIR filter. And the control unit 50 notifies m_A being the decimating rate for the reception rate and the interpolating rate for the transmission rate.

On completing the above notifications and the setting of the related components in the sampling unit 10, the radio system starts reception and judges whether the reception state of the communication protocol A is good or not good referring to the header information contained in the reception data 62 outputted from the BB unit 40 or the detection result by CRC. On completing the judgment of the reception state of the communication protocol A, the radio system performs the judgment of the reception state as to the communication protocols B, C, and D in the same manner. From all the judgments of the reception states, the radio system presents the communication protocol in the best reception state and the communication protocol possible of communications at the lowest cost, and a user will make an arbitrary selection referring to this information. Setting the parameters for the selected communication protocol again will start communications.

For switching the communication protocol in reality, the radio system has to notify the RF unit 30 of the synthesizer setting data for varying the carrier frequency and the BB unit 40 of the parameters for setting the modulation and demodulation, in addition to the sampling unit 10. However, these points deviate from the gist of the invention, and the explanation thereof will be omitted. In this embodiment, the description has been made on the assumption that there are four different communication protocols; however naturally, the invention can be applied to other communication protocols as well.

Further in this embodiment, the sampling in the base band has been taken as an example; however naturally, the invention can be applied to the sampling in the IF band. This can be realized by inserting digital orthogonal demodulators between the AD converters 103, 104 and the FIR filters 105, 106, and inserting digital orthogonal modulators between the DA converters 111, 112 and the FIR filters 113, 114, in FIG. 2. In the case of the sampling in the IF band, it is possible to omit each one of the AD converters 103, 104 and the anti-alias filters 101, 102 for reception, and each one of the DA converters 111, 112 and the anti-alias filters 109, 110 for transmission.

The rate conversion coefficient m in the RX rate conversion units 107, 108 and the TX rate conversion units 115, 116 may be divided into plural rate conversion coefficients. For example, setting m as i×j×k, the rate conversion units corresponding to three types of rate conversion coefficients i, j, and k maybe provided. Especially in the case of presuming the sampling in the IF band, the units located at the input terminals and output terminals of the orthogonal modulators and orthogonal demodulators become possible of processing with an appropriate rate to reduce the power consumption. Further in this embodiment, the rate conversion method in the rate conversion units has been described with the zero inserting processing in the transmission system and the decimating processing in the reception system; however, the rate conversions may be performed both in the transmission and reception systems with a CIC (Cascaded Integrator Comb) filter that is comparably easy of arithmetic operations.

The invention has been described with the software defined radio system capable of transmission and reception; however, the software defined radio system may be a software defined radio device dedicated to reception, or a software defined radio device dedicated to transmission. And, the invention can be applied to a sampling device that performs analog/digital conversions to plural signals having different bandwidths, for example, a cable communication, and an optical, magnetic, or magneto-optical recording device, and so forth.

What is claimed is:

1. A radio communication device conforming to plural communication protocols which performs communications with signals having different signal bandwidths, comprising:
   an RF unit that performs transmission and reception of a radio signal,
   a signal processing unit,
   a sampling unit connected between the RF unit and the signal processing unit which performs A/D conversion to a reception signal inputted from the RF unit and outputted to the signal processing unit and D/A conversion to a transmission signal inputted from the signal processing unit and outputted to the RF unit, and
   a control unit that controls the sampling unit,
   wherein the sampling unit includes:
   an anti-alias filter that performs filtering to the signals having signal bandwidths of the plural communication protocols by one cutoff frequency,
   an A/D converter and a D/A converter that perform A/D conversion and D/A conversion with suitable sampling frequencies for each of the communication protocols,
   a reception rate converter,
   a transmission rate converter, and
   a clock supply unit that supplies clocks to the A/D converter, the reception rate converter-6, the D/A converter, and the transmission rate converter on the basis of notification from the control unit,
   the cutoff frequency of the anti-alias filter is set not lower than the maximum signal bandwidth of the plural communication protocols,
   the A/D converter and the D/A converter sample the transmission signal and the reception signal with a sampling frequency not lower than double the cutoff frequency,
   the reception rate converter outputs to the signal processing unit a signal having an output signal from the A/D converter decimated by a decimating rate determined on the basis of a relation between each of the signal bandwidths of the communication protocols and the sampling frequency,
   the transmission rate converter outputs an input signal to the D/A converter while interpolating the transmission signal inputted from the signal processing unit by an interpolating rate determined on the basis of a relation between each of the signal bandwidths of the communication protocols and the sampling frequency, and
   the clock supply unit supplies a first clock conforming to the sampling frequency to the A/D converter and the D/A converter, and supplies a second clock conforming to the decimating rate and the interpolating rate to the reception rate converter and the transmission rate converter.

2. The radio communication device according to claim 1, wherein the sampling frequency is set to an integral multiple of the signal bandwidth for each of the communication protocols.

3. A radio communication device conforming to plural communication protocols which performs communications with signals having different signal bandwidths, comprising:
   an RF unit that performs transmission and reception of a radio signal,
   a signal processing unit,
   a sampling unit connected between the RF unit and the signal processing unit which performs A/D conversion to a reception signal inputted from the RF unit and outputted to the signal processing unit and D/A conversion to a transmission signal inputted from the signal processing unit and outputted to the RF unit, and
   a control unit that controls the sampling unit,
   wherein the sampling unit includes:
   an anti-alias filter that performs filtering to the signals having signal bandwidths of the plural communication protocols by one cutoff frequency,
   an A/D converter and a D/A converter that perform A/D conversion and D/A conversion with suitable sampling frequencies for each of the communication protocols,
   a reception rate converter,
   a transmission rate converter, and
   a clock supply unit that supplies clocks to the A/D converter, the reception rate converter, the D/A converter, and the transmission rate converter on the basis of notification from the control unit,
   wherein the clock supply unit includes a PLL circuit and a frequency divider, operates the PLL circuit and the frequency divider on the basis of a frequency dividing rate VCODIV for a VCO frequency divider, a frequency dividing rate REFDIV for a reference frequency divider, and a frequency dividing rate m conforming to the communication protocols, which are notified from the control unit, and thereby supplies a clock conforming to each of the protocols to the A/D converter, the reception rate converter, the D/A converter, and the transmission rate converter.

4. The radio communication device according to claim 1, wherein the control unit stores in advance control information corresponding to the respective communication protocols, which include variables to be notified to the sampling unit, and outputs the control information corresponding to the communication protocol being used to the sampling unit.

5. The radio communication device according to claim 1, wherein the control unit notifies parameters corresponding to plural communication protocols sequentially to the sampling unit to perform receptions with the plural communication protocols, and determines a communication protocol to be used on the basis of the reception state of each of the communication protocols.

6. A radio communication control method in a radio communication device conforming to plural communication protocols which performs communications with signals having different signal bandwidths, in which the radio communication device includes an RF unit that transmits and receives a radio signal, a sampling unit connected to the RF unit, a signal processing unit connected to the sampling unit, and a control unit that controls the sampling unit, wherein the sampling unit performs the steps of:
   filtering a reception signal of each of the communication protocols inputted from the RF unit with an anti-alias filter by one cutoff frequency,
   receiving control information on each of the communication protocols from the control unit,
   performing A/D conversion to the reception signal for each of the communication protocols on the basis of the control information with a suitable sampling frequency,
   performing reception rate conversion in which the sampled reception signal is decimated at a decimating rate based on the control information,
   outputting the reception signal having the reception rate conversion applied thereto to the signal processing unit,
   setting the cutoff frequency of the anti-alias filter not lower than the maximum signal bandwidth of the plural communication protocols, performing A/D conversion in an A/D converter while sampling a transmission signal with a sampling frequency not lower than double the cutoff frequency, and outputting a signal to the signal processing unit from a reception rate converter, in which an output signal from the A/D converter is decimated by a decimating rate determined on the basis of a relation between each of the signal bandwidths of the communication protocols and the sampling frequency, wherein:

the A/D converter operates to receive a supply of a first clock conforming to the sampling frequency from a clock supply unit, and the reception rate converter operates to receive a supply of a second clock conforming to the decimating rate from the clock supply unit.

7. The radio communication control method according to claim 6, wherein the sampling frequency is set to an integral multiple of the signal bandwidth for each of the communication protocols.

8. A radio communication control method in a radio communication device conforming to plural communication protocols which performs communications with signals having different signal bandwidths, in which the radio communication device includes an RF unit that transmits and receives a radio signal, a sampling unit connected to the RF unit, a signal processing unit connected to the sampling unit, and a control unit that controls the sampling unit, wherein the sampling unit performs the steps of:

filtering a reception signal of each of the communication protocols inputted from the RF unit with an anti-alias filter by one cutoff frequency, receiving control information on each of the communication protocols from the control unit, performing A/D conversion to the reception signal for each of the communication protocols on the basis of the control information with a suitable sampling frequency, performing reception rate conversion in which the sampled reception signal is decimated at a decimating rate based on the control information, and outputting the reception signal having the reception rate conversion applied thereto to the signal processing unit, wherein the clock supply unit having a PLL circuit and a frequency divider, operates the PLL circuit and the frequency divider on the basis of a frequency dividing rate VCODIV for a VCO frequency divider, a frequency dividing rate REFDIV for a reference frequency divider, and a frequency dividing rate m conforming to the communication protocols, which are notified from the control unit, and thereby supplies a clock conforming to each of the protocols to the A/D converter, the reception rate converter, the D/A converter, and the transmission rate converter.

9. The radio communication control method according to claim 6, wherein the control unit stores in advance control information corresponding to the respective communication protocols, which include variables to be notified to the sampling unit, and outputs the control information corresponding to the communication protocol being used to the sampling unit.

10. The radio communication control method according to claim 6, wherein the control unit notifies parameters corresponding to plural communication protocols sequentially to the sampling unit to perform receptions with the plural communication protocols, and determines a communication protocol to be used on the basis of the reception state of each of the communication protocols.

11. The radio communication control method according to claim 6, wherein the sampling unit interpolates a transmission signal inputted from the signal processing unit by a rate corresponding to the decimating rate, performs D/A conversion to the interpolated transmission signal by a cycle determined in the same manner as the A/D conversion, performs filtering to the D/A converted transmission signal by the same cutoff frequency as that of the anti-alias filter for the reception signal to output the result to the RF unit, and transmits it from the RF unit.

12. A sampling device which is connected to an RF unit that performs transmission and reception processing to a radio signal in a radio communication device conforming to plural communication protocols which performs communications with signals having different signal bandwidths, a signal processing unit that performs digital signal processing to a transmission signal and a reception signal, and a control unit, the sampling unit comprising:

a first anti-alias filter that performs filtering to the signals having signal bandwidths of the plural communication protocols by one cutoff frequency, an A/D converter that performs A/D conversion to the reception signal with a suitable sampling frequency for each of the communication protocols, and a reception rate converter that performs rate conversion to the A/D converted reception signal on the basis of a relation between each of the signal bandwidths of the communication protocols and the sampling frequency, wherein:

the cutoff frequency of the first anti-alias filter is set not lower than the maximum signal bandwidth of the plural communication protocols, the A/D converter samples the transmission signal with a sampling frequency not lower than double the cutoff frequency, the reception rate converter outputs to the signal processing unit a signal having an output signal from the A/D converter decimated by a decimating rate determined on the basis of a relation between each of the signal bandwidths of the communication protocols and the sampling frequency, the A/D converter operates to receive a supply of a first clock conforming to the sampling frequency from a clock supply unit, and the reception rate converter operates to receive a supply of a second clock conforming to the decimating rate from the clock supply unit.

13. The sampling device according to claim 12, wherein the sampling frequency is set to an integral multiple of the signal bandwidth for each of the communication protocols.

14. The sampling device according to claim 12, wherein the sampling device receives notification of control information, which includes variables to be notified to the sampling unit and is stored in advance to correspond with the respective communication protocols, from the control unit, and controls the sampling frequency of the A/D converter and the decimating rate of the reception rate converter on the basis of the control information.

15. The sampling device according to claim 12, further comprising: a transmission rate converter that interpolates a transmission signal inputted from the signal processing unit by a rate corresponding to the decimating rate, a D/A converter that performs D/A conversion to the interpolated transmission signal by a cycle determined in the same manner as the A/D conversion, and a second anti-alias filter that performs filtering to the D/A converted transmission signal by the same cutoff frequency as that of the first anti-alias filter to output the result to the RF unit.

16. The radio communication device according to claim 1, wherein the clock supply unit includes a PLL circuit and a frequency divider, operates the PLL circuit and the frequency divider on the basis of a frequency dividing rate VCODIV for a VCO frequency divider, a frequency dividing rate REFDIV for a reference frequency divider, and a frequency dividing rate m conforming to the communication protocols, which are notified from the control unit, and thereby supplies a clock conforming to each of the protocols to the A/D converter, the reception rate converter, the D/A converter, and the transmission rate converter.

17. The radio communication device according to claim 3, wherein the control unit stores in advance control information corresponding to the respective communication protocols, which include variables to be notified to the sampling unit, and outputs the control information corresponding to the communication protocol being used to the sampling unit.

18. The radio communication device according to claim 3, wherein the control unit notifies parameters corresponding to plural communication protocols sequentially to the sampling unit to perform receptions with the plural communication protocols, and determines a communication protocol to be used on the basis of the reception state of each of the communication protocols.

19. The radio communication control method according to claim 8, wherein the control unit stores in advance control information corresponding to the respective communication protocols, which include variables to be notified to the sampling unit, and outputs the control information corresponding to the communication protocol being used to the sampling unit.

20. The radio communication control method according to claim 8, wherein the control unit notifies parameters corresponding to plural communication protocols sequentially to the sampling unit to perform receptions with the plural communication protocols, and determines a communication protocol to be used on the basis of the reception state of each of the communication protocols.

21. The radio communication control method according to claim 8, wherein the sampling unit interpolates a transmission signal inputted from the signal processing unit by a rate corresponding to the decimating rate, performs D/A conversion to the interpolated transmission signal by a cycle determined in the same manner as the A/D conversion, performs filtering to the D/A converted transmission signal by the same cutoff frequency as that of the anti-alias filter for the reception signal to output the result to the RF unit, and transmits it from the RF unit.

* * * * *